United States Patent
Ikegaya (10) Patent No.: US 9,618,731 B2
(45) Date of Patent: Apr. 11, 2017

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Yuki Ikegaya, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/091,850

(22) Filed: Apr. 6, 2016

(65) Prior Publication Data

US 2016/0299317 A1 Oct. 13, 2016

(30) Foreign Application Priority Data

Apr. 13, 2015 (JP) ................................. 2015-081513

(51) Int. Cl.
- *G02B 13/04* (2006.01)
- *G02B 9/10* (2006.01)
- *G02B 13/00* (2006.01)

(52) U.S. Cl.
CPC .............. *G02B 13/04* (2013.01); *G02B 9/10* (2013.01); *G02B 13/006* (2013.01)

(58) Field of Classification Search
CPC .................................. G02B 9/10; G02B 13/04
USPC ....... 359/793, 740, 749–753, 761, 762, 770, 359/781, 783, 784
See application file for complete search history.

(56) References Cited

U.S. PATENT DOCUMENTS

2012/0105981 A1* 5/2012 Peng .................... G02B 13/005
                                                                  359/753
2013/0063829 A1* 3/2013 Kang .................... G02B 13/04
                                                                  359/753

FOREIGN PATENT DOCUMENTS

| JP | H04-267212 A | 9/1992 |
| JP | 2004-145256 A | 5/2004 |

OTHER PUBLICATIONS

U.S. Appl. No. 15/013,053, filed Feb. 2, 2016; inventor: Ikegaya.

* cited by examiner

*Primary Examiner* — Darryl J Collins
(74) *Attorney, Agent, or Firm* — Carter, DeLuca, Farrell & Schmidt, LLP

(57) ABSTRACT

Provided is an optical system, including, in order from an object side to an image side: a front group having a negative refractive power; an aperture stop; and a rear group having a positive refractive power, in which: the front group consists of in order from the object side to the image side: a negative first lens (L1) having a concave surface facing the image side; a second lens (L2); and a third lens (L3); the rear group consists of, in order from the object side to the image side: a positive fourth lens (L4); and a negative cemented lens (L56), which is obtained by cementing a positive fifth lens (L5) and a negative sixth lens (L6); and a focal length f56 of the cemented lens (L56) and a focal length f of the optical system are each appropriately set.

10 Claims, 5 Drawing Sheets

OPTICAL SYSTEM AND IMAGE PICKUP APPARATUS INCLUDING THE SAME

BACKGROUND OF THE INVENTION

Field of the Invention

The present invention relates to an optical system, which is suitable for being used as an image pickup optical system to be used for an image pickup apparatus such as a silver-halide film camera, a digital still camera, a digital video camera, a monitoring camera, and a TV camera.

Description of the Related Art

In recent years, there has been a demand for an optical system used for an image pickup apparatus to be compact as a whole and to have a wide field angle that facilitates photographing of a wide range. For example, a video camera, an on-vehicle camera, and the like are demanded to have as wide a field angle as a photographing field angle of at least 120° in order to photograph a wide range and to have a small distortion in order to enhance visibility in the periphery of a screen. Hitherto, as an optical system that meets those demands, there is known an optical system including a front group having a negative refractive power, an aperture stop, and a rear group having a positive refractive power in order from an object side to an image side.

In Japanese Patent Application Laid-Open No. 2004-145256, there is disclosed a wide angle lens including a negative lens, a cemented lens of a positive lens and a negative lens, an aperture stop, a positive lens, and a cemented lens of a positive lens and a negative lens in order from the object side to the image side and having a photographing field angle of from 130° to 180°. In Japanese Patent Application Laid-Open No. H04-267212, there is disclosed a super wide angle lens including a negative lens, a negative lens, a positive lens, a positive lens, and a cemented lens of a negative lens and a positive lens in order from the object side to the image side and having a photographing field angle of 140°.

In the optical system having a wide field angle, in general, the front group having a negative refractive power is arranged on the object side relative to the aperture stop, and the rear group having a positive refractive power is arranged on the image side relative thereto. This arrangement exhibits an asymmetric refractive power across the aperture stop, which is liable to cause various aberrations ascribable to asymmetry such as a coma, a distortion, and a lateral chromatic aberration. Particularly when an attempt is made to shorten an entire lens length while achieving a wide field angle, the refractive power of the negative lens on the object side becomes strong, and the refractive power of the positive lens on the image side becomes strong, which makes it difficult to maintain the distortion to a low level.

In Japanese Patent Application Laid-Open No. 2004-145256, the cemented lens having a positive refractive power is arranged closest to the image side. In addition, the distortion is set to from −48% to −85% by a central projection method with an ideal image height of Y=f×tan (ω), where Y represents an image height, f represents a focal length of the entire system, and ω represents a half field angle, to thereby reduce the distortion while achieving a wide field angle.

Further, in Japanese Patent Application Laid-Open No. H04-267212, the cemented lens having a positive refractive power is arranged closest to the image side. In addition, the distortion is set to −70% by the central projection method with the ideal image height of Y=f×tan( 63 ), to thereby reduce the distortion while achieving a wide field angle.

However, when an attempt is made to shorten the entire lens length while maintaining the wide field angle, the refractive power of the negative lens close to the object side and the refractive power of the positive lens close to the image side become strong, which increases the distortion.

In order to obtain high optical characteristics with a wide field angle and a small distortion over the entire screen while shortening the entire lens length and downsizing the entire system, it is important to appropriately set a lens configuration of lens units before and after the aperture stop within the optical system. Without appropriate settings thereof, it is difficult to obtain a compact optical system having high optical characteristics with a wide field angle and a small distortion.

SUMMARY OF THE INVENTION

According to one embodiment of the present invention, there is provided an optical system, including, in order from an object side to an image side:
  a front group having a negative refractive power; an aperture stop; and
  a rear group having a positive refractive power, in which:
  the front group consists of, in order from the object side to the image side:
    a first lens having a negative refractive power and having a concave surface facing the image side;
    a second lens; and
    a third lens;
  the rear group consists of, in order from the object side to the image side:
    a fourth lens having a positive refractive power; and
    a cemented lens having a negative refractive power, which is obtained by cementing a fifth lens having a positive refractive power and a sixth lens having a negative refractive power; and
  the following conditional expression is satisfied:

$$-130.0 < f56/f < -10.0$$

where f56 represents a focal length of the cemented lens, and f represents a focal length of the optical system.

Further features of the present invention will become apparent from the following description of exemplary embodiments with reference to the attached drawings.

DESCRIPTION OF THE EMBODIMENTS

Now, an optical system and an image pickup apparatus including the same according to exemplary embodiments of the present invention are described.

An optical system according to one embodiment of the present invention consists of, in order from an object side to an image side: a front group having a negative refractive power; an aperture stop; and a rear group having a positive refractive power. The front group consists of, in order from the object side to the image side: a first lens L1 having a negative refractive power and having a concave surface facing the image side; a second lens L2; and a third lens L3. The rear group consists of, in order from the object side to the image side: a fourth lens L4 having a positive refractive power; and a cemented lens L56 having a negative refractive power, which is obtained by cementing a fifth lens L5 having a positive refractive power and a sixth lens L6 having a negative refractive power.

Figure 1:
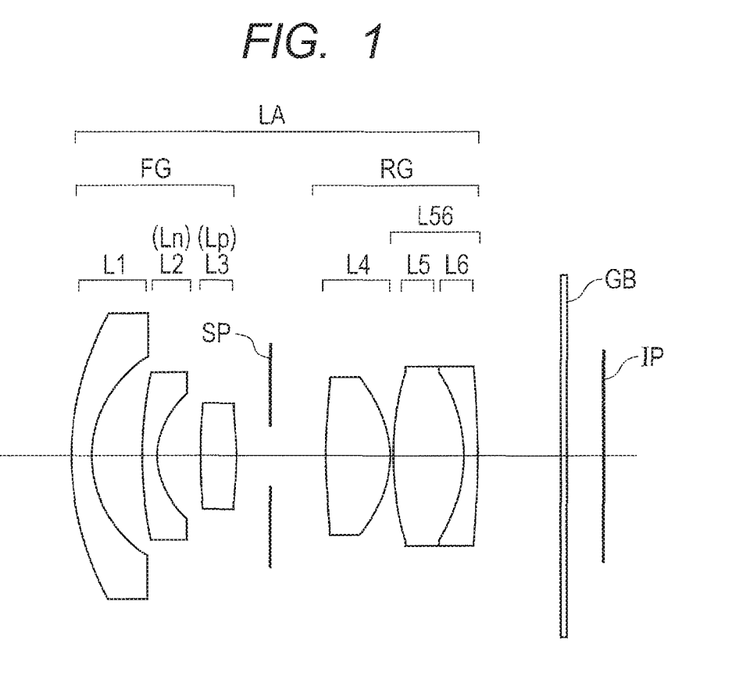
FIG. 1 is a sectional view of a lens obtained when an object at infinity is brought into focus in a wide-angle single-focus lens according to Example 1 of the present invention.
Figure 2:
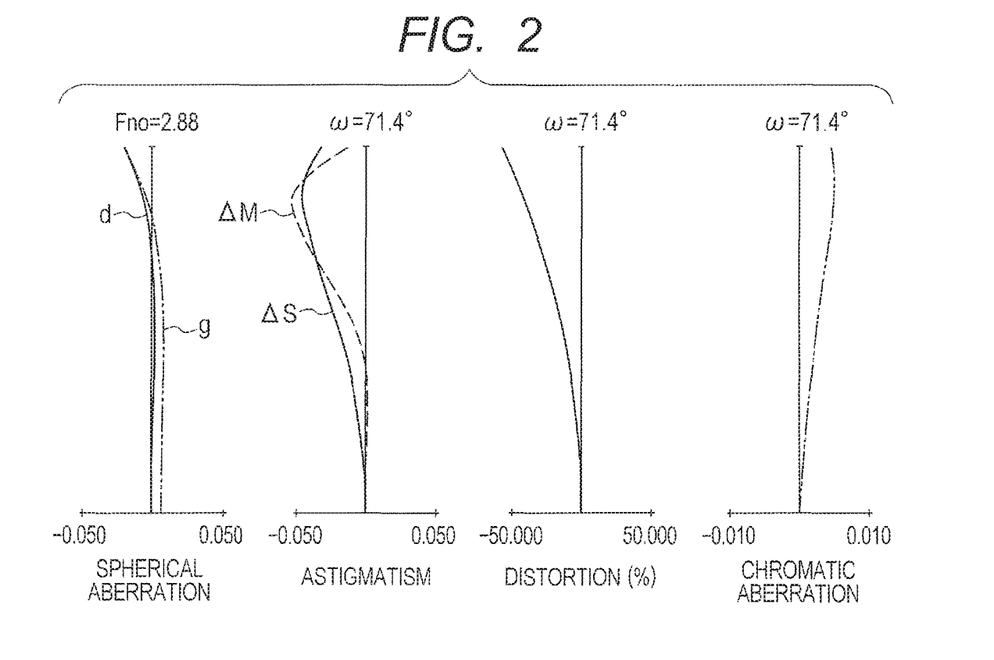
FIG. 2 is aberration diagrams obtained when the object at infinity is brought into focus in the wide-angle single-focus lens according to Example 1 of the present invention.
Figure 3:
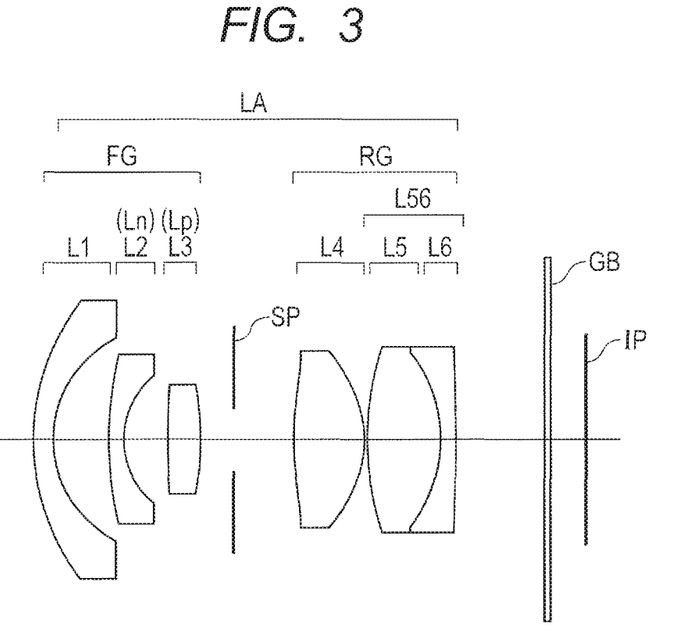
FIG. 3 is a sectional view of a lens obtained when an object at infinity is brought into focus in a wide-angle single-focus lens according to Example 2 of the present invention.
Figure 4:
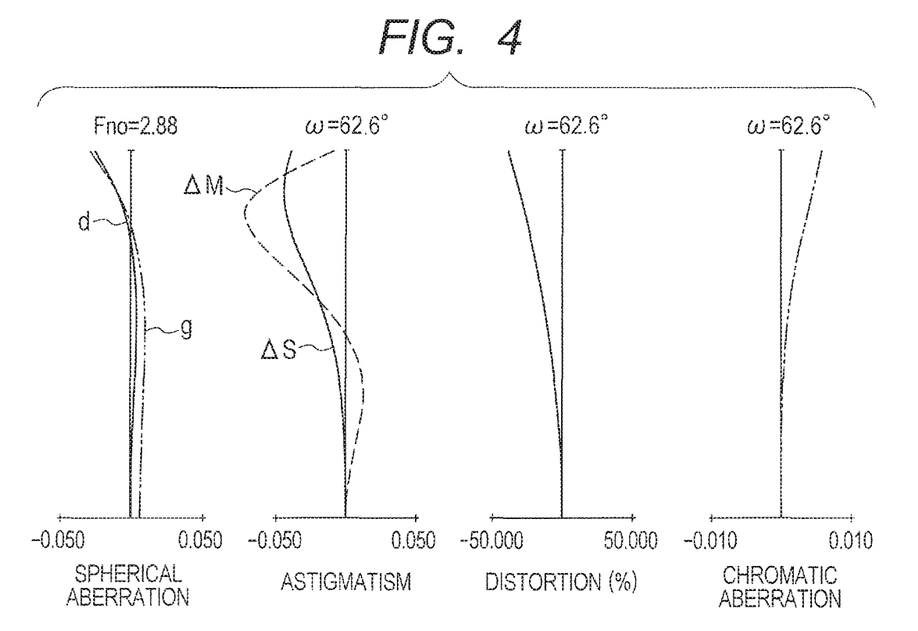
FIG. 4 is aberration diagrams obtained when the object at infinity is brought into focus in the wide-angle single-focus lens according to Example 2 of the present invention.
Figure 5:
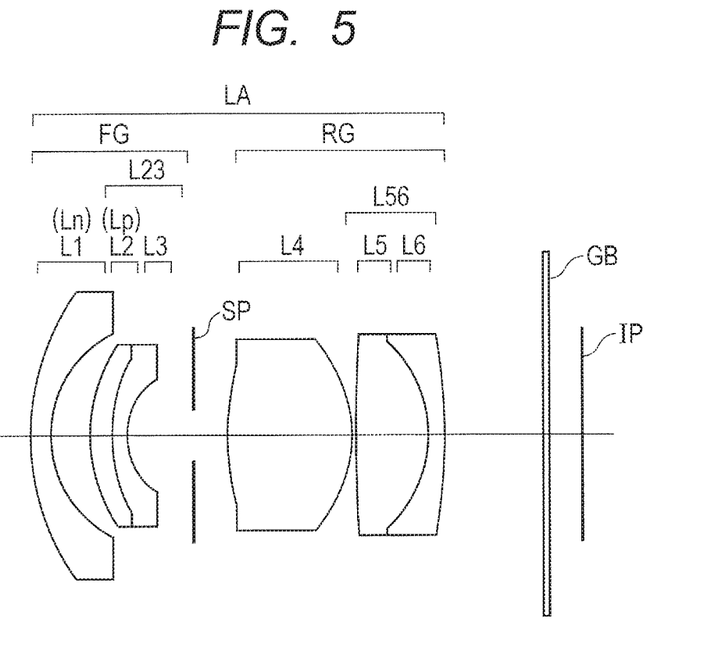
FIG. 5 is a sectional view of a lens obtained when an object at infinity is brought into focus in a wide-angle single-focus lens according to Example 3 of the present invention.
Figure 6:
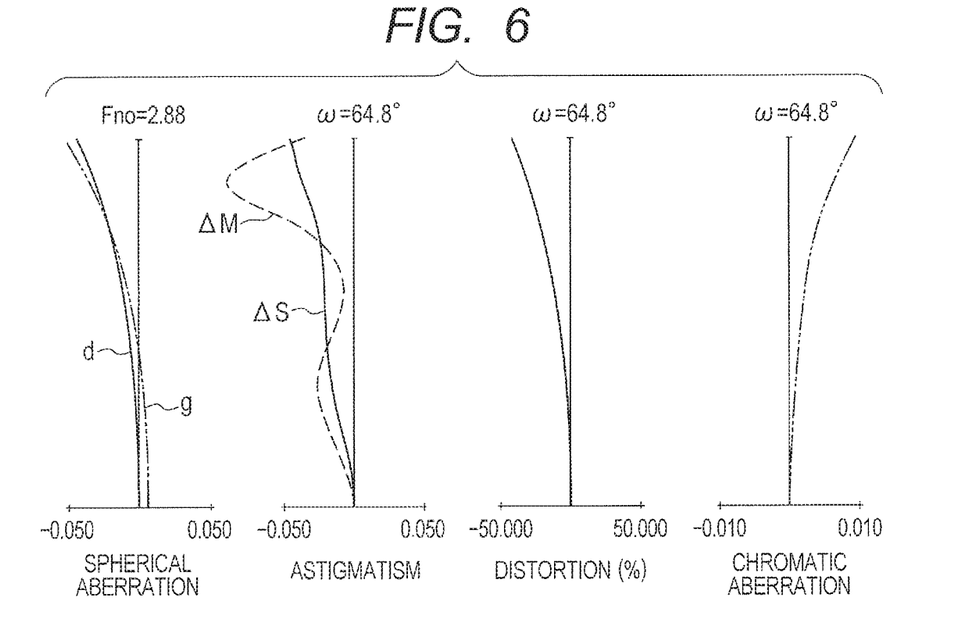
FIG. 6 is aberration diagrams obtained when the object at infinity is brought into focus in the wide-angle single-focus lens according to Example 3 of the present invention.
Figure 7:
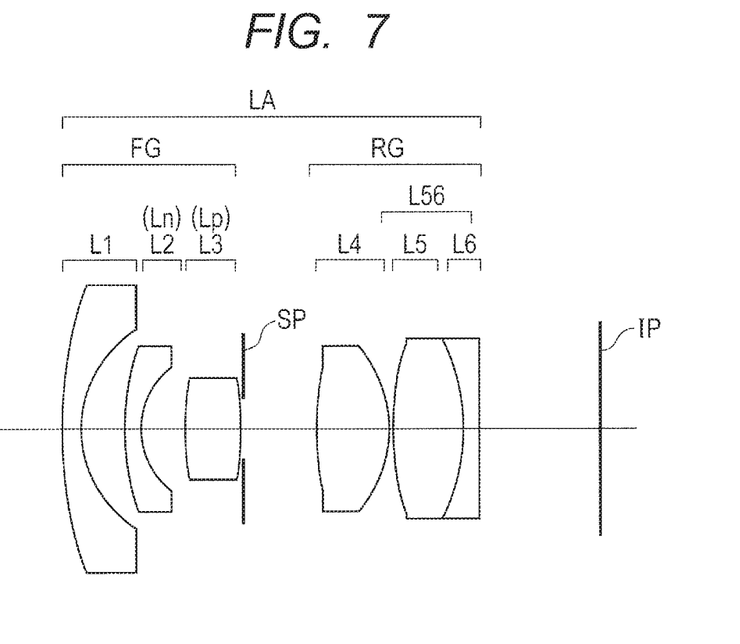
FIG. 7 is a sectional view of a lens obtained when an object at infinity is brought into focus in a wide-angle single-focus lens according to Example 4 of the present invention.
Figure 8:
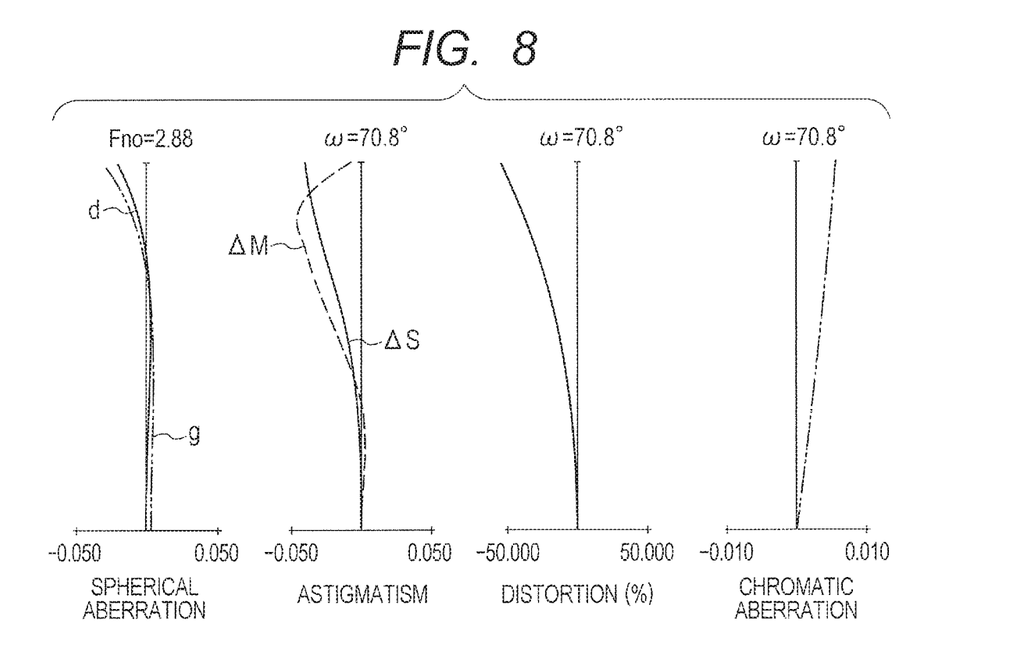
FIG. 8 is aberration diagrams obtained when the object at infinity is brought into focus in the wide-angle single-focus lens according to Example 4 of the present invention.
Figure 9:
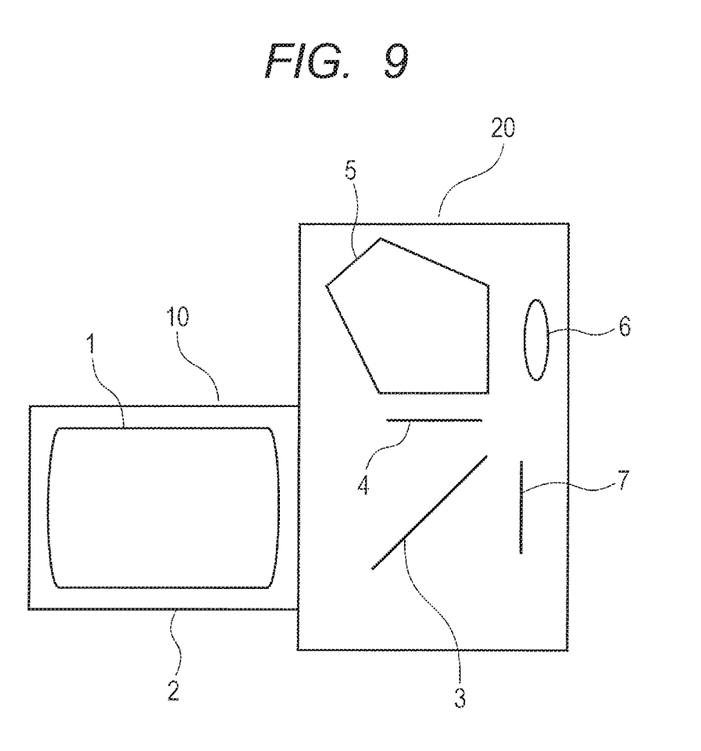
FIG. 9 is a schematic view of a main part of an image pickup apparatus of the present invention.

FIG. 1 is a sectional view of a lens according to Example 1 of the present invention. FIG. 2 is longitudinal aberration diagrams obtained when an object at infinity is brought into focus according to Example 1. FIG. 3 is a sectional view of a lens according to Example 2 of the present invention. FIG. 4 is longitudinal aberration diagrams obtained when an object at infinity is brought into focus according to Example 2. FIG. 5 is a sectional view of a lens according to Example 3 of the present invention. FIG. 6 is longitudinal aberration diagrams obtained when an object at infinity is brought into focus according to Example 3. FIG. 7 is a sectional view of a lens according to Example 4 of the present invention. FIG. 8 is longitudinal aberration diagrams obtained when an object at infinity is brought into focus according to Example 4. FIG. 9 is a schematic view of a camera (image pickup apparatus) including the optical system of the present invention.

The optical system according to each of the Examples is suitable for being used as an image pickup optical system to be used for an image pickup apparatus (optical apparatus) such as a digital still camera, a digital video camera, or a silver-halide film camera. In the sectional view of the lens, the left is the object side (front. side) and the right is the image side (rear side). Note that, the optical system of each of the Examples may be used as a projection lens of a projector or the like. In this case, the left is a screen side, and the right is a projected image side.

In the sectional view of the lens, an optical system LA includes, across an aperture stop SP, a first group FG having a negative refractive power on the object side and a rear group RG having a positive refractive power on the image side. Symbol Li represents an i-th lens unit, and the optical system LA includes a cemented lens L23 and a cemented lens L56 having a negative refractive power. When the optical system LA is used as an image pickup optical system of a digital video camera or a digital still camera, an image plane IP corresponds to an image pickup surface of a solid-state image pickup element (photo-electric conversion element) such as a COD sensor or a CMOS sensor. In a case of a silver-halide film camera, the image plane IP corresponds to a film surface thereof.

The respective longitudinal aberration diagrams are illustrations of a spherical aberration, an astigmatism, a distortion, and a lateral chromatic aberration in order from the left. In the longitudinal aberration diagram for showing the spherical aberration, a solid line d indicates a d-line (587.6 nm), and a two-dot chain line g indicates a g-line (435.8 nm). In addition, in the longitudinal aberration diagram for showing the astigmatism, a solid line ΔS indicates a sagittal direction ΔS of the d-line, and a broken line ΔM indicates a meridional direction. ΔM of the d-line. Further, the longitudinal aberration diagram for showing the distortion indicates a distortion in the d-line. The lateral chromatic aberration is indicated by the g-line with respect to the d-line. Symbol Fno denotes an F number, and symbol ω denotes a half field angle (degree) of a photographing field angle.

In the longitudinal aberration diagram for showing the distortion, an ideal image height is set as Y=f×tan(ω), and an amount of deviation therefrom is expressed. In the optical system LA according to each Example, all the lenses that form the rear group RG having a positive refractive power play an equivalent role from the viewpoint of the aberration. The fourth lens L4 having a positive refractive power has an aspherical shape, to thereby satisfactorily correct a spherical aberration and a coma. The fifth lens L5 having a positive refractive power uses a low dispersion material, to thereby reduce a lateral chromatic aberration, and is arranged near the fourth lens L4 having a positive refractive power with a convex surface thereof facing the object side, to thereby reduce a spherical aberration.

The sixth lens L6 having a negative refractive power uses a high dispersion material, to thereby correct the lateral chromatic aberration, and is arranged closest to the image side, to thereby reduce the distortion. The cemented lens L56 having a negative refractive power has a negative lens arranged in the rear group RG having a positive refractive power, to thereby correct a field curvature, and is arranged closest to the image side, to thereby reduce the distortion.

Next, a lens configuration of the optical system LA according to each Example other than the above-mentioned features is described.

Example 1

Example 1 of the present invention is described below with reference to FIG. 1 and FIG. 2. The lens configuration is as follows in order from the object side to the image side. The front group FG is formed of the first lens L1 having a negative refractive power, the second lens L2 having a negative refractive power, and the third lens L3 having a positive refractive power. The rear group RG is formed of the fourth lens L4 having a positive refractive power and the cemented lens L56 having a negative refractive power, which is obtained by cementing the fifth lens L5 having a positive refractive power and the sixth lens 16 having a negative refractive power.

The first lens L1 and the second lens L2 are formed to have a meniscus shape with a concave surface thereof facing the image side, to thereby widen a photographing field angle and reduce the distortion. The third lens L3 uses a high dispersion material, to thereby correct the lateral chromatic aberration caused by the first lens L1 and the second lens L2, and is arranged near the aperture stop, to thereby reduce the spherical aberration.

Example 2

Example 2 of the present invention is described below with reference to FIG. 3 and FIG. 4. The lens configuration is as follows in order from the object side to the image side. The front group FG is formed of the first lens L1 having a negative refractive power, the second lens L2 having a negative refractive power, and the third lens L3 having a positive refractive power. The rear group RG is formed of the fourth lens L4 having a positive refractive power and the cemented lens L56 having a negative refractive power, which is obtained by cementing the fifth lens L5 having a positive refractive power and the sixth lens L6 having a negative refractive power.

The first lens L1 and the second lens L2 are formed to have a meniscus shape with a concave surface thereof facing the image side, to thereby widen a photographing field angle and reduce the distortion. The third lens L3 uses a high dispersion material, to thereby correct the lateral chromatic aberration caused by the first lens L1 and the second lens 12, and is arranged near the aperture stop SP, to thereby reduce the spherical aberration.

Example 3

Example 3 of the present invention is described below with reference to FIG. 5 and FIG. 6. The lens configuration is as follows in order from the object side to the image side. The front group FG is formed of the first lens L1 having a negative refractive power, and a cemented lens L23 obtained by cementing the second lens L2 having a positive refractive power, and the third lens L3 having a negative refractive power. The rear group RG is formed of the fourth lens L4 having a positive refractive power and the cemented lens L56 having a negative refractive power, which is obtained by cementing the fifth lens L5 having a positive refractive power and the sixth lens L6 having a negative refractive power.

The first lens L1 and the third lens L3 are formed to have a meniscus shape with a concave surface thereof facing the image side, to thereby widen a photographing field angle and reduce the distortion. The second lens L2 uses a high dispersion material, to thereby correct the lateral chromatic aberration caused by the first lens L1 and the third lens L3.

Example 4

Example 4 of the present invention is described below with reference to FIG. 7 and FIG. 8. The lens configuration is as follows in order from the object side to the image side. The front group FG is formed of the first lens L1 having a negative refractive power, the second lens L2 having a negative refractive power, and the third lens L3 having a positive refractive power. The rear group RG is formed of the fourth lens L4 having a positive refractive power and the cemented lens L56 having a negative refractive power, which is obtained by cementing the fifth lens L5 having a positive refractive power and the sixth lens L6 having a negative refractive power.

The first lens L1 and the second lens L2 are formed to have a meniscus shape with a concave surface thereof facing the image side, to thereby widen a photographing field angle and reduce the distortion. The third lens L3 uses a high dispersion material, to thereby correct the lateral chromatic aberration caused by the first lens L1 and the second lens L2, and is arranged near the aperture stop, to thereby reduce the spherical aberration.

The optical system LA according to each Example includes the front group FG having a negative refractive power, the aperture stop SP, and the rear group RG having a positive refractive power in order from the object side to the image side. The front group FG is formed of the first lens L1 having a negative refractive power and having a concave shape facing the image side, the second lens L2, and the third lens L3. The rear group RG is formed of the fourth lens L4 having a positive refractive power and the cemented lens L56 having a negative refractive power, which is obtained by cementing the fifth lens L5 having a positive refractive power and the sixth lens L6 having a negative refractive power. Of the two lenses of the second lens L2 and the third lens L3 within the front group FG, one is set as the negative lens, and the other is set as the positive lens, to thereby reduce the distortion and satisfactorily correct the lateral chromatic aberration.

Further, the cemented lens L56 has a negative lens arranged in the rear group PG having a positive refractive power, to thereby correct the field curvature, and is arranged closest to the image side, to thereby reduce the distortion. In addition, an incident angle of an off-axis light flux with respect to the image plane exhibits oblique incidence, which is utilized to shorten an entire lens length. The cemented lens L56 is set to have a focal length of f56, and the entire system is set to have a focal length of f. With the above-mentioned settings, the following conditional expression is satisfied.

$$-130.0 < f56/f < -10.0 \tag{1}$$

Next, a technical meaning of the above-mentioned conditional expression is described. Conditional Expression (1) appropriately defines a ratio of the focal length of the cemented lens L56 to the focal length of the entire system in order to reduce the distortion and shorten the entire lens length.

When the negative refractive power of the cemented lens L56 becomes stronger (when the absolute value of the negative refractive power becomes larger) such that the ratio exceeds the upper limit value of Conditional Expression (1), the incident angle of the off-axis light flux with respect to the image plane increases. As a result, it is difficult to use the optical system LA for the image pickup apparatus including a solid-state image pickup element that requires telecentric imaging in the image plane. When the negative refractive power of the cemented lens L56 becomes weaker (when the absolute value of the negative refractive power becomes smaller) such that the ratio falls below the lower limit value of Conditional Expression (1), it is difficult to reduce the distortion. Further, the incident angle of the off-axis light flux with respect to the image plane does not exhibit oblique incidence, which makes it difficult to shorten the entire lens length.

Note that, it is further preferred that the numerical value range of Conditional Expression (1) be set as follows.

$$-110.0 < f56/f < -15.0 \tag{1a}$$

It is further preferred in one embodiment of the present invention, that at least one of the following conditional expressions be satisfied. The fifth lens L5 is set to have a focal length of f5, and the sixth lens L6 is set to have a focal length of f6. The fourth lens L4 is set to have a focal length of f4. The entire lens length is set as D. A material of the sixth lens L6 is set to have a refractive index of Nd6. An air-equivalent, distance from a lens surface of the sixth lens L6 on the image side to the image plane is set as Sk. The front group FG includes a lens Lp having a positive refractive power and a lens Ln having a negative refractive power which is arranged adjacently on the object side of the lens Lp. The lens surface of the lens Ln on the image side is set to have a curvature radius of Rn, and the lens surface of the lens Lp on the object side is set to have a curvature radius of Rp.

In this case, in Example 1, Example 2, and Example 4, the lens Lp corresponds to the third lens L3, and the lens Ln corresponds to the second lens 12. Further, in Example 3, the lens Lp corresponds to the second lens L2, and the lens Ln corresponds to the first lens L1. With the above-mentioned settings, it is preferred that at least one of the following conditional expressions be satisfied.

$$-1.0 < f6/f5 < -0.7 \quad (2)$$

$$1.2 < f4/f < 2.0 \quad (3)$$

$$4.5 < D/f < 8.0 \quad (4)$$

$$1.85 < Nd6 < 2.40 \quad (5)$$

$$Sk/f < 2.0 \quad (6)$$

$$-10.0 < (Rn+Rp)/(Rn-Rp) < -0.8 \quad (7)$$

Next, technical meanings of the above--mentioned conditional expressions are described. Conditional Expression (2) appropriately defines a ratio of the focal length of the sixth lens L6 to the focal length of the fifth lens L5 in order to maintain a chromatic aberration and the distortion at low levels. When the negative refractive power of the sixth lens L6 becomes stronger such that the ratio exceeds the upper limit value of Conditional Expression (2), it is easy to correct the lateral chromatic aberration, but it is difficult to reduce a chromatic field curvature. When the negative refractive power of the sixth lens L6 becomes weaker such that the ratio falls below the lower limit value of Conditional Expression (2), it is difficult to reduce the lateral chromatic aberration and the distortion.

Conditional Expression (3) appropriately defines a ratio of the focal length of the fourth lens L4 to the focal length of the entire system in order to reduce the spherical aberration. When the positive refractive power of the fourth lens L4 becomes weaker such that the ratio exceeds the upper limit value of Conditional Expression (3), it is difficult to strengthen the negative refractive power of the cemented lens L56, and it is also difficult to reduce the distortion. When the positive refractive power of the fourth lens L4 becomes stronger such that the ratio falls below the lower limit value of Conditional Expression (3), it is difficult to reduce the spherical aberration.

Conditional Expression (4) is used to achieve a shortened entire lens length and an effective diameter of front lens reduced for a compact size. When the entire lens length becomes longer such that D/f exceeds the upper limit, value of Conditional Expression (4), the refractive power of each individual lens becomes weak, which makes it difficult to reduce the effective diameter of front lens for a compact size. When the entire lens length becomes shorter such that D/f falls below the lower limit value of Conditional Expression (4), the positive refractive power of the fourth lens L1 becomes strong, which makes it difficult to reduce the spherical aberration.

Conditional Expression (5) appropriately defines the refractive index of the material of the sixth lens L6 in order to maintain the chromatic aberration at a low level. When the refractive index of the material of the sixth lens L6 becomes higher such that Nd6 exceeds the upper limit value of Conditional Expression (5), the refractive power of a cemented lens surface becomes strong, which makes it difficult to reduce the chromatic field curvature. When the refractive index of the material of the sixth lens L6 becomes lower such that Nd6 falls below the lower limit value of Conditional Expression (5), it is difficult to reduce the curvature radius of the cemented lens surface, and hence the negative refractive power of the sixth lens L6 becomes weak, which makes it difficult to correct the lateral chromatic aberration.

Conditional Expression (6) appropriately defines a distance between the sixth lens L6 and the image plane in order to shorten the entire lens length. When the distance between the sixth lens L6 and the image plane becomes longer such that Skit: exceeds the upper limit value of Conditional Expression (6), the incident angle of the off-axis light flux with respect to the image plane does not exhibit oblique incidence, which makes it difficult to shorten the entire lens length.

Conditional Expression (7) appropriately defines a shape factor of an air lens formed between the lens Lp and the lens Ln in order to satisfactorily correct the field curvature in the lens Lp. When the lens surface of the lens Lp on the object side has a shape of a surface more convex toward the object side such that (Rn+Rp)/(Rn-Rp) falls below the lower limit value of Conditional Expression (7), it is difficult to reduce the distortion. When the curvature radius of the lens surface of the lens Lp on the object side becomes larger such that (Rn+Rp)/(Rn-Rp) exceeds the upper limit value of Conditional Expression (7), it is difficult to correct the field curvature.

Note that, it is further preferred in each Example that the numerical value ranges of Conditional Expressions (2) to (7) be set as follows.

$$-0.96 < f6/f5 < -0.75 \quad (2a)$$

$$1.28 < f4/f < 1.92 \quad (3a)$$

$$5.0 < D/f < 7.0 \quad (4a)$$

$$1.87 < Nd6 < 2.20 \quad (5a)$$

$$Sk/f < 1.8 \quad (6a)$$

$$-7.5 < (Rn+Rp)/(Rn-Rp) < -0.9 \quad (7a)$$

The exemplary embodiments of the present invention are described above, but the present invention is not limited to these embodiments and can be modified and changed variously within the scope of the gist thereof.

Next, a single-lens reflex camera serving as an image pickup apparatus of FIG. 9 is described. In FIG. 9, an image pickup optical system 10 includes an optical system 1 of any one of Examples 1 to 4. The image pickup optical system 10 is held by a lens barrel 2 as a holding member. 20 is a camera main body. The camera main body 20 includes a quick return mirror 3, a focusing plate 4, a penta roof prism 5, an eyepiece 6, and the like. The quick return mirror 3 reflects a ray from the image pickup optical system 10 upward. The focusing plate 4 is arranged at an image forming position of the image pickup optical system 10. The penta roof prism 5 converts a reverse image formed on the focusing plate 4 into an erect image.

An observer observes the erect image through the eyepiece 6. As a photosensitive plane 7, there is arranged a solid-state image pickup element (photoelectric transducer) such as a CCD sensor or a CMOS sensor configured to receive the image, or a silver halide film. When taking an image, the quick return mirror 3 is retracted from the optical path, and an image is formed on the photosensitive plane 7 by the image pickup optical system 10.

In this way, by applying the optical system to an image pickup optical system such as a single-lens reflex camera interchangeable lens, it is possible to provide an image pickup apparatus having high optical characteristics. Note that, the optical system of the present invention can be applied not only to an image pickup apparatus, such as a digital camera, a video camera, and a silver-halide film camera but also to optical equipment such as a telescope, binoculars, a copying machine, and a projector. Further, the present invention is equally applicable to a mirrorless single-lens reflex camera without the quick return mirror.

Numerical Data 1 to 4 corresponding to Examples 1 to 4 are described below. In each Data, i indicates the order of surfaces from the object side, ri indicates the curvature radius of i-th (i-th surface), di indicates an interval between the i-ch surface and the (i+1)th surface, and ndi and vdi indicate the refractive index and Abbe number based on the d-line, respectively. BF indicates an air-equivalent back focus. A total lens length is a value obtained by adding the value of the back focus to a length from the first lens surface to the final lens surface.

In addition, an aspheric surface is indicated by a suffix "*" of the surface number. An aspheric surface shape is expressed by the following equation, where X represents a displacement from a surface vertex in the optical axis direction, h represents a height from the optical axis in the direction perpendicular to the optical axis, represents a paraxial curvature radius, K represents a conic constant, and A4, A6, A8, and A10 represent aspheric coefficients of individual orders.

$$X(h) = \frac{(1/r)h^2}{1 + \sqrt{1 - (1+K)(h/r)^2}} + A4 \cdot h^4 + A6 \cdot h^6 + A8 \cdot h^8 + A10 \cdot h^{10}$$

Further, "e±XX" in each aspheric coefficient means "×10$^{\pm XX}$". Further, values corresponding to the individual conditional expressions are shown in Table 1.

(Numerical Data 1)

| Unit mm | | | | |
|---|---|---|---|---|
| Surface data | | | | |
| Surface Number | r | d | nd | vd |
| 1 | 8.880 | 0.60 | 1.77250 | 49.6 |
| 2 | 3.498 | 1.49 | | |
| 3 | 11.931 | 0.45 | 1.69350 | 53.2 |
| 4* | 2.392 | 1.30 | | |
| 5 | 20.368 | 1.06 | 1.88300 | 40.8 |
| 6 | −9.883 | 1.00 | | |
| 7 (Stop) | ∞ | 1.65 | | |
| 8* | 11.069 | 1.92 | 1.59201 | 67.0 |
| 9* | −3.260 | 0.10 | | |
| 10 | 8.907 | 2.10 | 1.48749 | 70.2 |
| 11 | −4.778 | 0.41 | 1.95906 | 17.5 |
| 12 | −28.415 | 2.45 | | |
| 13 | ∞ | 0.20 | 1.51633 | 64.1 |
| 14 | ∞ | 1.07 | | |
| Image plane | ∞ | | | |

| Unit mm |
|---|
| Aspherical surface data |

Fourth surface

K = 0.00000e+000 A4 = −6.00733e−004 A6 = 4.04176e−004
A8 = −1.37712e−004

Eighth surface

K = 0.00000e+000 A4 = −3.41536e−003 A6 = 9.91319e−005

Ninth surface

K = 0.00000e+000 A4 = 2.90439e−003 A6 = −3.07623e−005
A8 = 2.69479e−005

| Various data | |
|---|---|
| Focal length | 2.43 |
| F-number | 2.88 |
| Half field angle (degree) | 52.50 |
| Image height | 3.17 |
| Total lens length | 15.73 |
| BF | 3.65 |

(Numerical Data 2)

| Unit mm | | | | |
|---|---|---|---|---|
| Surface data | | | | |
| Surface Number | r | d | nd | vd |
| 1 | 6.642 | 0.60 | 1.77250 | 49.6 |
| 2 | 3.333 | 1.66 | | |
| 3 | 10.527 | 0.45 | 1.67790 | 50.7 |
| 4 | 2.451 | 1.34 | | |
| 5 | 121.448 | 0.96 | 1.88300 | 40.8 |
| 6 | −8.849 | 1.00 | | |
| 7 (Stop) | ∞ | 1.80 | | |
| 8* | 10.187 | 2.11 | 1.59201 | 67.0 |
| 9* | −3.357 | 0.09 | | |
| 10 | 8.738 | 2.20 | 1.48749 | 70.2 |
| 11 | −4.250 | 0.46 | 1.89286 | 20.4 |
| 12 | −60.727 | 2.65 | | |
| 13 | ∞ | 0.20 | 1.51633 | 64.1 |
| 14 | ∞ | 1.03 | | |
| Image plane | ∞ | | | |

| Aspherical surface data |
|---|

Eighth surface

K = 0.00000e+000 A4 = −2.54592e−003 A6 = 1.09793e−004

Ninth surface

K = 0.00000e+000 A4 = 2.97969e−003 A6 = −4.04537e−005
A8 = 2.97203e−005

| Various data | |
|---|---|
| Focal length | 2.68 |
| F-number | 2.88 |
| Half field angle (degree) | 49.78 |
| Image height | 3.17 |
| Total lens length | 16.48 |
| BF | 3.81 |

(Numerical Data 3)

Unit mm

Surface data

| Surface Number | r | d | nd | νd |
|---|---|---|---|---|
| 1 | 7.295 | 0.60 | 1.83481 | 42.7 |
| 2* | 3.377 | 1.19 | | |
| 3 | 4.947 | 0.64 | 1.95906 | 17.5 |
| 4 | 4.947 | 0.45 | 1.54701 | 46.2 |
| 5 | 1.941 | 2.01 | | |
| 6 (Stop) | ∞ | 1.03 | | |
| 7* | 8.696 | 3.74 | 1.82080 | 42.7 |
| 8* | −3.464 | 0.12 | | |
| 9 | 82.587 | 2.14 | 1.74100 | 52.6 |
| 10 | −3.814 | 0.49 | 2.10420 | 17.0 |
| 11 | −15.730 | 2.93 | | |
| 12 | ∞ | 0.20 | 1.51633 | 64.1 |
| 13 | ∞ | 1.01 | | |
| Image plane | ∞ | | | |

Aspherical surface data

Second surface

K = 0.00000e+000 A4 = −1.88086e−003 A6 = 1.29962e−004
A8 = −1.33757e−005
Seventh surface K = 0.00000e+000 A4 = −2.70061e−003 A6 = 3.58514e−004
Eighth surface K = 0.00000e+000 A4 = 3.42379e−003 A6 = 2.16410e−004
A8 = −1.74455e−005 A10 = 3.44742e−006

Various data

| Focal length | 2.57 |
|---|---|
| F-number | 2.88 |
| Half field angle (degree) | 50.92 |
| Image height | 3.17 |
| Total lens length | 16.48 |
| BF | 4.07 |

(Numerical Data 4)

Unit mm

Surface data

| Surface Number | r | d | nd | νd |
|---|---|---|---|---|
| 1 | 13.480 | 0.60 | 1.69680 | 55.5 |
| 2 | 3.579 | 1.34 | | |
| 3* | 7.703 | 0.50 | 1.69350 | 53.2 |
| 4* | 2.284 | 1.40 | | |
| 5 | 12.052 | 1.72 | 1.70154 | 41.2 |
| 6 | −12.052 | 0.06 | | |
| 7 (Stop) | ∞ | 2.31 | | |
| 8* | 9.461 | 2.27 | 1.59201 | 67.0 |
| 9* | −3.394 | 0.10 | | |
| 10 | 8.922 | 2.20 | 1.48749 | 70.2 |
| 11 | −6.104 | 0.45 | 1.95906 | 17.5 |
| 12 | 126.862 | 3.78 | | |
| Image plane | ∞ | | | |

Aspherical surface data

Third surface

K = 0.00000e+000 A4 = 2.89811e−003 A6 = −3.19022e−004
Fourth surface

K = 0.00000e+000 A4 = −4.69590e−004 A6 = 9.20615e−004
A8 = −2.31641e−004 A10 = −6.94765e−005

Unit mm

Eighth surface

K = 0.00000e+000 A4 = −2.84486e−003 A6 = 1.65312e−004
Ninth surface

K = 0.00000e+000 A4 = 3.59159e−003 A6 = −9.10774e−006
A8 = 3.06456e−005

Various data

| Focal length | 2.48 |
|---|---|
| F-number | 2.88 |
| Half field angle (degree) | 51.99 |
| Image height | 3.17 |
| Total lens length | 16.74 |
| BF | 3.78 |

TABLE 1

| | | Example | | | |
|---|---|---|---|---|---|
| | Conditional Expression | 1 | 2 | 3 | 4 |
| 1 | −130 < f56/f < −10 | −83.214 | −20.598 | −27.033 | −17.299 |
| 2 | −1.0 < f6/f5 < −0.7 | −0.899 | −0.827 | −0.937 | −0.776 |
| 3 | 1.2 < f4/f < 2.0 | 1.842 | 1.691 | 1.363 | 1.825 |
| 4 | 4.5 < D/f < 8.0 | 6.472 | 6.154 | 6.409 | 6.763 |
| 5 | 1.85 < Nd6 < 2.4 | 1.959 | 1.893 | 2.104 | 1.959 |
| 6 | Sk/f < 2.0 | 1.502 | 1.423 | 1.583 | 1.527 |
| 7 | −10.0 < (Rn + Rp)/(Rn − Rp) < −0.8 | −1.266 | −1.041 | −5.302 | −1.468 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081513, filed Apr. 13, 2015, which is hereby incorporated by reference herein in its entirety.

What is claimed is:

1. An optical system, comprising, in order from an object side to an image side:
   a front group having a negative refractive power;
   an aperture stop; and
   a rear group having a positive refractive power, wherein:
   the front group consists of, in order from the object side to the image side:
      a first lens having a negative refractive power and having a concave surface facing the image side;
      a second lens; and
      a third lens;
   the rear group consists of, in order from the object side to the image side:
      a fourth lens having a positive refractive power; and
      a cemented lens having a negative refractive power, which is obtained by cementing a fifth lens having a positive refractive power and a sixth lens having a negative refractive power; and
   the following conditional expression is satisfied:

$$-130.0 < f56/f < -10.0$$

where f56 represents a focal length of the cemented lens, and f represents a focal length of the optical system.

2. An optical system according to claim 1, wherein the following conditional expression is satisfied:

$$-1.0 < f6/f5 < -0.7$$

where f5 represents a focal length of the fifth lens, and f6 represents a focal length of the sixth lens.

3. An optical system according to claim 1, wherein the following conditional expression is satisfied:

$$1.2 < f4/f < 2.0$$

where f4 represents a focal length of the fourth lens.

4. An optical system according to claim 1, wherein the following conditional expression is satisfied:

$$4.5 < D/f < 8.0$$

where D represents an entire lens length.

5. An optical system according to claim. I, wherein the following conditional expression is satisfied:

$$1.85 < Nd6 < 2.40$$

where Nd6 represents a refractive index of a material of the sixth lens.

6. An optical system according to claim 1, wherein the following conditional expression is satisfied:

$$Sk/f < 2.0$$

where Sk represents an air-equivalent distance from a lens surface of the sixth lens on the image side to an image plane.

7. An optical system according to claim 1, wherein:
the front group comprises:
   a lens (Lp) having a positive refractive power; and
   a lens (Ln) having a negative refractive power, which is arranged adjacently on the object side of the lens (Lp); and
the following conditional expression is satisfied:

$$-10.0 < (Rn+Rp)/(Rn-Rp) < -0.8$$

where Rn represents a curvature radius of a lens surface of the lens (Ln) on the image side, and Rp represents a curvature radius of a lens surface of the lens (Lp) on the object side.

8. An optical system according to claim. 7, wherein:
the second lens comprises a negative lens having a concave surface facing the image side;
the third lens comprises a positive lens having a convex surface facing the object side;
the second lens corresponds to the lens (Ln); and
the third lens corresponds to the lens (Lp).

9. An optical system according to claim 7, wherein:
the second lens comprises a positive lens having a convex surface facing the object side;
the third lens comprises a negative lens having a concave surface facing the image side;
the first lens corresponds to the lens (Ln); and
the second lens corresponds to the lens (Lp).

10. An image pickup apparatus, comprising:
an optical system; and
a photo-electric conversion element configured to receive light of an image formed by the optical system,
the optical system comprising, in order from an object side to an image side:
a front group having a negative refractive power;
an aperture stop; and
a rear group having a positive refractive power, wherein:
the front group consists of, in order from the object side to the image side:
   a first lens having a negative refractive power and having a concave surface facing the image side;
   a second lens; and
   a third lens;
the rear group consists of, in order from the object side to the image side:
   a fourth lens having a positive refractive power; and
   a cemented lens having a negative refractive power, which is obtained by cementing a fifth lens having a positive refractive power and a sixth lens having a negative refractive power; and
the following conditional expression is satisfied:

$$-130.0 < f56/f < -10.0$$

where f56 represents a focal length of the cemented lens, and f represents a focal length of the optical system.

* * * * *